US012766758B2

(12) United States Patent
Odintsov

(10) Patent No.: US 12,766,758 B2
(45) Date of Patent: Oct. 20, 2026

(54) APPARATUS FOR SPLITTING MATERIALS, METHOD OF USE, AND MANUFACTURE THEREOF

(71) Applicant: Dmytro Odintsov, Kyiv (UA)

(72) Inventor: Dmytro Odintsov, Kyiv (UA)

( * ) Notice: Subject to any disclaimer, the term of this patent is extended or adjusted under 35 U.S.C. 154(b) by 399 days.

(21) Appl. No.: 17/847,221

(22) Filed: Jun. 23, 2022

(65) Prior Publication Data

US 2023/0415371 A1 Dec. 28, 2023

(51) Int. Cl.
*B27L 7/06* (2006.01)

(52) U.S. Cl.
CPC ............... *B27L 7/06* (2013.01); *Y10T 225/20* (2015.04)

(58) Field of Classification Search
CPC ............... B27L 7/005; B27L 7/06; B27L 7/08
See application file for complete search history.

(56) References Cited

U.S. PATENT DOCUMENTS 7,096,901 B2 * 8/2006 Brazzola ................... B27L 7/06 144/195.4
10,124,507 B2 * 11/2018 Zhu ........................ B27G 21/00
10,906,202 B2 * 2/2021 Hutchinson ............... B27L 7/06
11,628,591 B2 * 4/2023 Janowski .................. B27L 7/06 144/366

FOREIGN PATENT DOCUMENTS

CN 107825555 A * 3/2018 ................ B27L 7/06
CN 108748567 A * 11/2018 ................ B27L 7/06

OTHER PUBLICATIONS

Homestead Handyman, Kindling Cracker—Firewood Kindling Splitter Review, Feb. 5, 2016, https://www.youtube.com/watch?v=4-RhakR3Hg8 (Year: 2016).*
CrazyRussianHacker, Half Ring Firewood Splitter, Jul. 14, 2021, https://www.youtube.com/watch?v=bHRSf5JZxVo (Year: 2021).*
Grillmer, Half Ring Kindling Splitter XL Split Wood of Any Size Better than Axe, Made in Europe, Jul. 13, 2021, https://www.youtube.com/watch?v=LkEPtqQy5to (Year: 2021).*

* cited by examiner

*Primary Examiner* — Matthew Katcoff
(74) *Attorney, Agent, or Firm* — Michael D. Eisenberg; MDE Patents

(57) ABSTRACT

According to a preferred embodiment of the invention, an apparatus for splitting materials comprises a base defined by a surface and a perimeter, the base having a plurality of holes and configured to support the apparatus, a pair of sleeves, a cutting mean, a vertical guide configured to join with the base, and a crescent-shaped element configured to join with the vertical guide. The cutting mean comprises a bottom end and an upward facing wedge. The upward facing wedge comprises an upward facing thorn formed on a top end of the wedge, a pair of ribs formed on opposite sides of the wedge, and a plurality of longitudinal grooves.

1 Claim, 5 Drawing Sheets

APPARATUS FOR SPLITTING MATERIALS, METHOD OF USE, AND MANUFACTURE THEREOF

TECHNICAL FIELD

The invention relates generally to apparatus and methods for splitting wood, and more particularly to apparatus for mechanically splitting materials and to the method of using the apparatus.

BACKGROUND

Splitting wood is a common task that people perform. For example, firewood is used to make a fire by cutting a log in length, and it is used for cooking as well as heating, and its usage is rapidly increasing due to the recent increase in the camping population. The split wood is also used for heating of building structures, saunas, campfires, and for the enjoyment of fire places. In general, the invention is applicable to agricultural, horticultural, forestry, commercial, industrial or domestic situations where material is required to be split to smaller pieces. For that purpose, people use a saw or an ax, but recently cutting devices started appearing on the market. The invention can be used from splitting wood through to applications where it can be used other materials.

It is known in the art that wood splitting mechanisms operate by driving a wedge into a log either by pushing the log onto the wedge, or by forcing a wedge into a log. Conventional wood splitters include a splitting wedge, a guide rod connected to the splitting wedge, and an impact weight that cross-sectionally surrounds the guide rod. The inventors have made repeated attempts to develop appropriate technical solutions.

For example, apparatuses using various electric (DE202018105945U1; DE202008002933U1; DE202008002460U1), hydraulic (U.S. Pat. No. 6,390,162B1; U.S. Pat. No. 7,882,868B2) and pneumatic (EP3421199A1) drives, are well known. Although such devices are convenient to use, additional drives increase the cost of using and repairing the inventions and require additional maintenance.

Apparatuses including the use of a maul (or other means) to drive a wedge into a log (U.S. Pat. Nos. 4,391,311A; 4,280,540A; DE202011109238U1; U.S. Pat. Nos. 4,378,037A; 4,211,264A; JP5462974B1; US20040035496A1) are well known. Such inventions look less preferable in comparison with solutions that involve the use of a maul (or other means) to drive a log into a wedge (U.S. D951,728S1; U.S. D934,041S1; U.S. Pat. No. 7,096,901B2; U.S. D904,837S1; U.S. D924,646S1; U.S. D881,662S1; RU196186U1; U.S. D845,725S1; U.S. D817,123S1; JP6934229B1), since due to the weight of the log, obviously, in the second example, there is an additional force for splitting it. Moreover, the portion significantly limits the size of the log that can be split and limits the use of apparatuses for logs with knots.

Many of the mentioned inventions contain an upper frame annular (or other closed) portion for increased user safety and/or log guidance (JP6934229B1, U.S. D817,123S1; U.S. D845,725S1; RU196186U1; U.S. D881,662S1; U.S. D924,646S1; U.S. D904,837S1). Unfortunately, such technical solutions mediate the sticking of a split log between a wedge and said portion. Other inventions (U.S. D951,728S1; U.S. D934,041S1; U.S. Pat. No. 7,096,901B2) by removing the annular portion lost the advantage of securing the log and did not substantially solved this problem.

Further areas of applicability of the present disclosure will become apparent from the detailed description, the claims and the drawings. The detailed description and specific examples are intended for purposes of illustration only and are not intended to limit the scope of the disclosure.

SUMMARY OF THE INVENTION

The claimed technical solution aims solving a technical problem, constituting a creation of an effective, safe, inexpensive, and highly portable device and a method with which the splitting materials is also effective, economically, and safely possible for end users.

According to a preferred embodiment of the invention, an apparatus for splitting materials comprises a base defined by a surface and a perimeter, the base having a plurality of holes and configured to support the apparatus, a pair of sleeves, a cutting mean, a vertical guide configured to join with the base, and a crescent-shaped element configured to join with the vertical guide. The cutting mean comprises a bottom end and an upward facing wedge. The upward facing wedge comprises an upward facing thorn formed on a top end of the wedge, a pair of ribs formed on opposite sides of the wedge, and a plurality of longitudinal grooves. The cutting mean is configured to join with the base by the bottom end through the first sleeve. The vertical guide is configured to join with the base through the second sleeve. The base is formed in one side concave inward ring. The cutting mean is joined with the base on the side of the concavity of the base and the vertical guide is joined with the base on the opposite side of the concavity of the base.

A method for splitting materials includes the following steps:

- obtaining an apparatus for splitting materials having a base, a pair of sleeves, a cutting mean, a vertical guide, and a crescent-shaped element.
- fixing an end of a material to be split on an upward facing thorn of an upward facing wedge of the cutting mean of the apparatus for splitting materials until the thorn until the thorn is substantially penetrated the material;
- locating behind the apparatus for splitting materials from the side of the crescent-shaped element;
- impacting the opposite end of the material thereby driving the material against the upward facing wedge consequently splitting of at least a portion of the material.

The method for splitting materials implementation may optionally include the step of fixing the apparatus for splitting materials on a surface through the plurality of holes of the apparatus for splitting materials.

A method for manufacturing an apparatus for splitting materials includes the following steps:

- cutting a sheet of iron until a base formed in one side concave inward ring is made;
- drilling a plurality of holes in the base;
- casting a cutting mean;
- milling the cutting mean until an upward facing wedge having an upward facing thorn, a pair of ribs on opposite sides of the wedge, and a plurality of longitudinal grooves is formed;
- cutting a pipe until a vertical guide and a pair of sleeves are made;
- welding the pair of sleeves with the base;
- casting a crescent-shaped element of a sheet of iron;
- drilling a plurality of holes in the crescent-shaped element the vertical guide;
- threading the pair of sleeves, the vertical guide, and the crescent-shaped element for bolting;

joining the crescent-shaped element with the vertical guide, the vertical guide with the base through the first sleeve, and the base with the cutting mean through the second sleeve.

BRIEF DESCRIPTION OF THE DRAWINGS

Other assemblies, systems, methods, apparatus, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Figure 1:
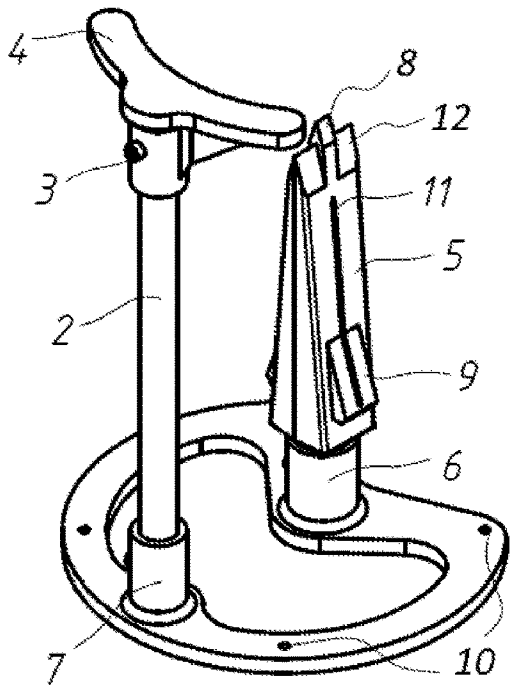
FIG. 1 is a perspective view of an apparatus for splitting materials according to the present disclosure.
Figure 2:
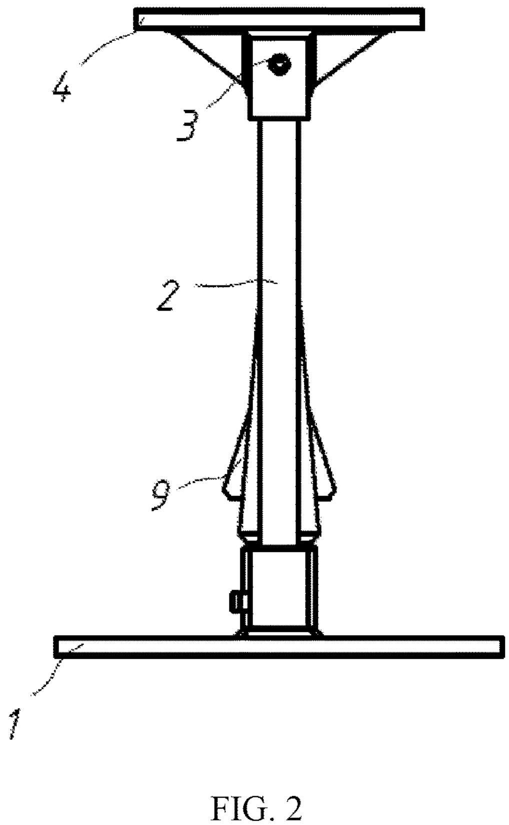
FIG. 2 is a front view of the apparatus for splitting materials according to the present disclosure.
Figure 3:
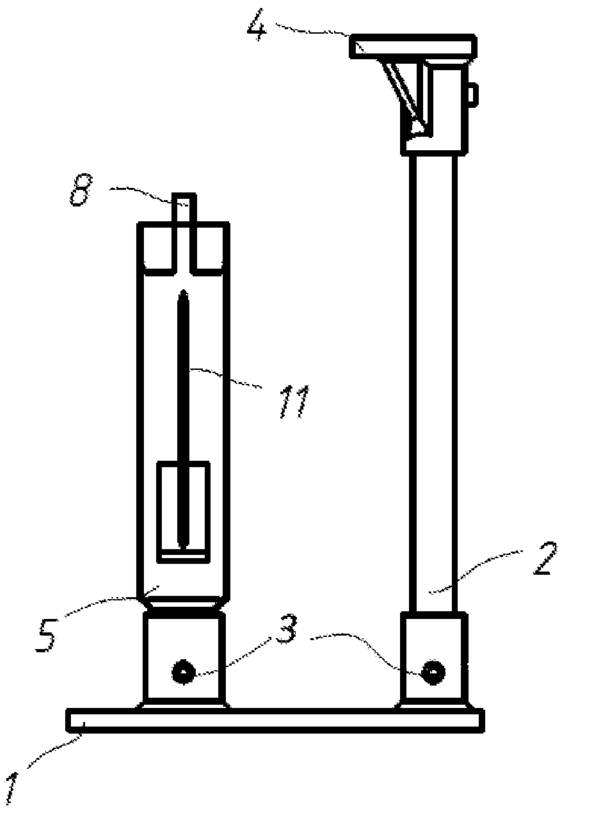
FIG. 3 is a left side view of the apparatus for splitting materials according to the present disclosure.
Figure 4:
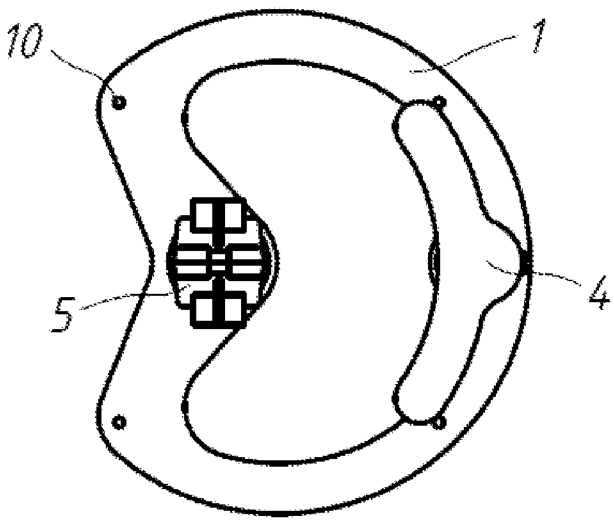
FIG. 4 is a top view of the apparatus for splitting materials according to the present disclosure.
Figure 5:
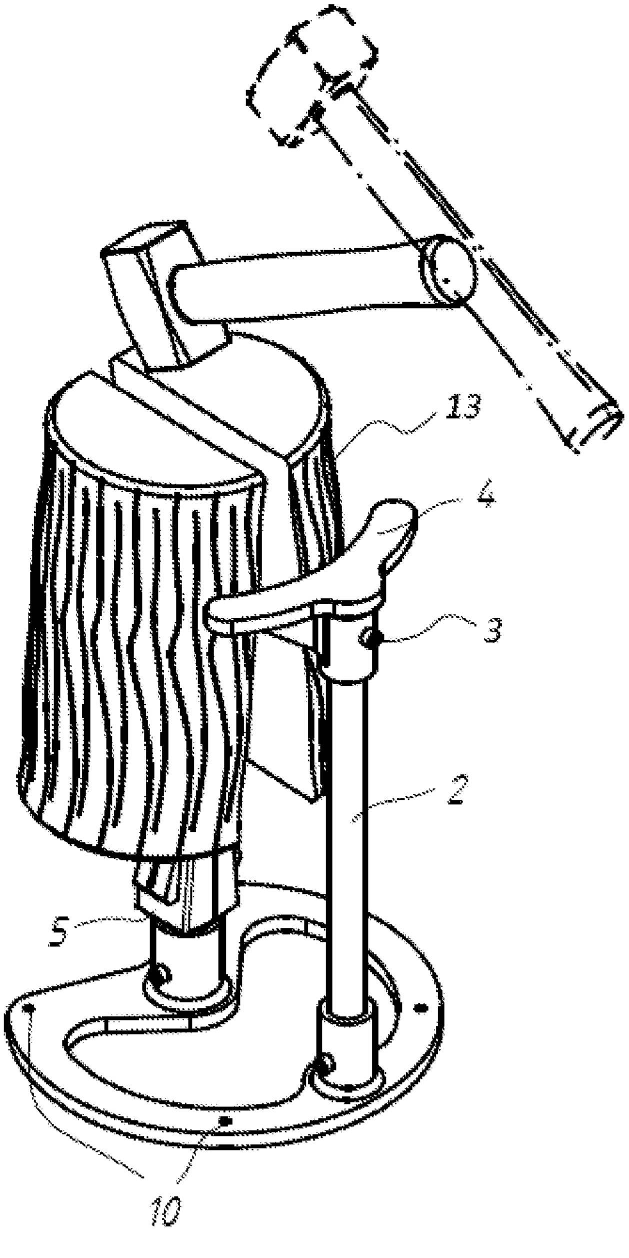
FIG. 5 is a perspective view of the apparatus for splitting materials showing the apparatus in its working position with the piece of wood.

According to a preferred embodiment of the invention (FIGS. 1-5) an apparatus for splitting materials, comprises a base 1 defined by a surface and a perimeter, the base 1 having a plurality of holes 10 and configured to support the apparatus, a pair of sleeves 6 and 7, a cutting mean 5, a vertical guide 2 configured to join with the base 1, and a crescent-shaped element 4 configured to join with the vertical guide 2. The cutting mean 5 comprises a bottom end and an upward facing wedge 12. The upward facing wedge 12 comprises an upward facing thorn 8 formed on a top end of the wedge, a pair of ribs 9 formed on opposite sides of the wedge 12, and a plurality of longitudinal grooves 11. The pair of ribs 9 and the plurality of longitudinal grooves 11 reduces the likelihood of jamming of splitting materials. The upward facing thorn 8 increases the reliability of fixing splitting materials.

The cutting mean 6 is configured to join with the base 1 by the bottom end through the first sleeve 6. For example, the bottom of the cutting mean 5 can be joined with the base 1 with the help of bolting 3. The vertical guide 2 is configured to join with the base through the second sleeve 7. For example, the bottom of the cutting mean 5 can be joined with the base 1 with the help of bolting 3. The base 1 is formed in one side concave inward ring. Thus, increased usability and safety of working with the apparatus is ensured—a user does not need to reach far for a material to be split; the crescent-shaped element 4 restricts the material from the user. The cutting mean 5 is joined with the base 1 on the side of the concavity of the base 1 and the vertical guide 2 is joined with the base 1 on the opposite side of the concavity of the base 1.

Figure 6:
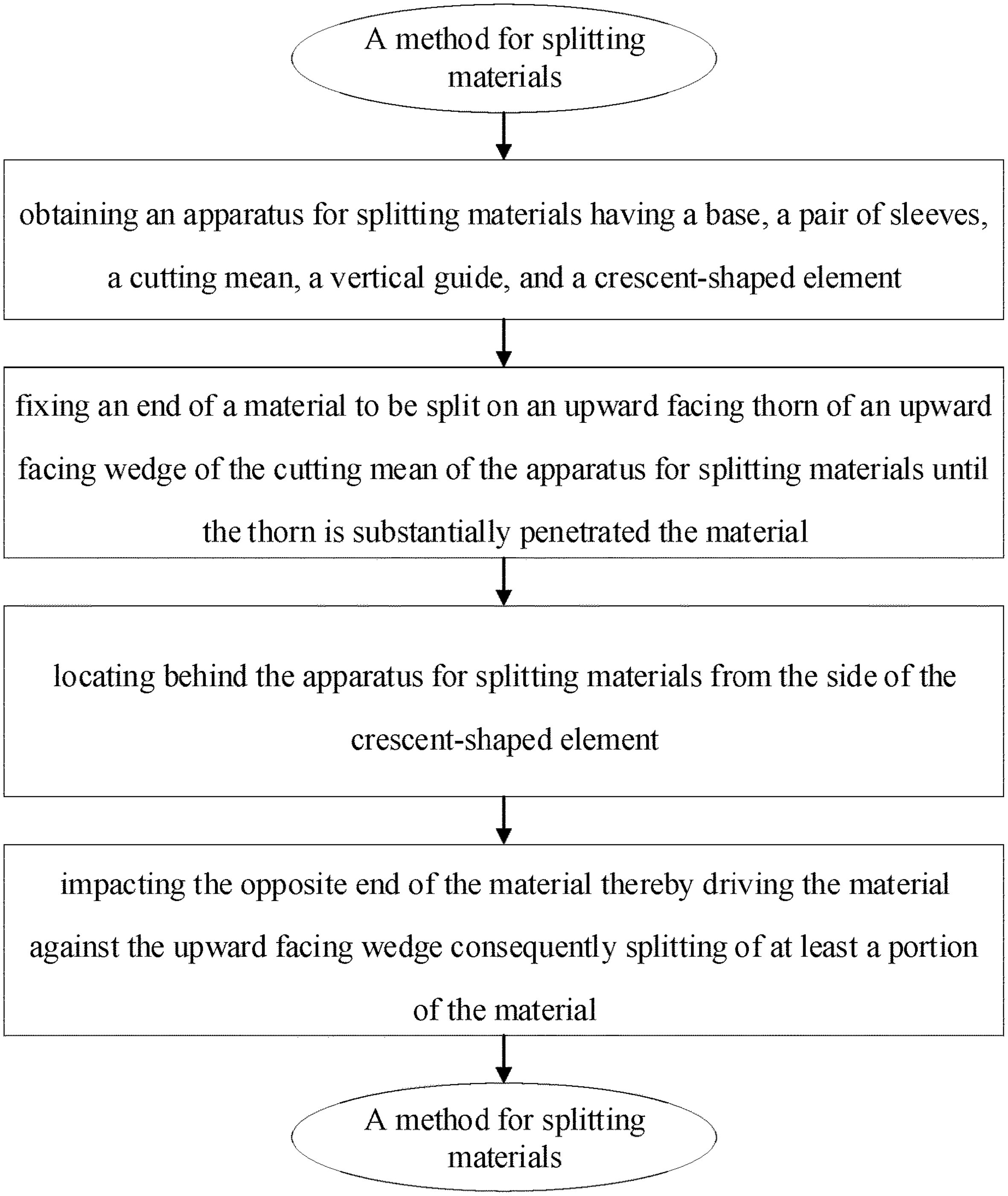
FIG. 6 is a process flow diagram that shows a process of splitting materials using the apparatus for splitting materials.

A method for splitting materials includes the following steps (FIGS. 1-6):

- obtaining the apparatus for splitting materials having the base 1, the pair of sleeves 6 and 7, the cutting mean 5, the vertical guide 2, and the crescent-shaped element 2.
- fixing an end of a material 13 to be split on the upward facing thorn 8 of the upward facing wedge 12 of the cutting mean 5 of the apparatus for splitting materials until the thorn until 8 the thorn is substantially penetrated the material 13;
- locating behind the apparatus for splitting materials from the side of the crescent-shaped element 4;
- impacting the opposite end of the material 13 thereby driving the material against the upward facing wedge 5 consequently splitting of at least a portion of the material 13.

The method for splitting materials implementation may optionally include the step of fixing the apparatus for splitting materials on a surface through the plurality of holes 10 of the apparatus for splitting materials.

Figure 7:
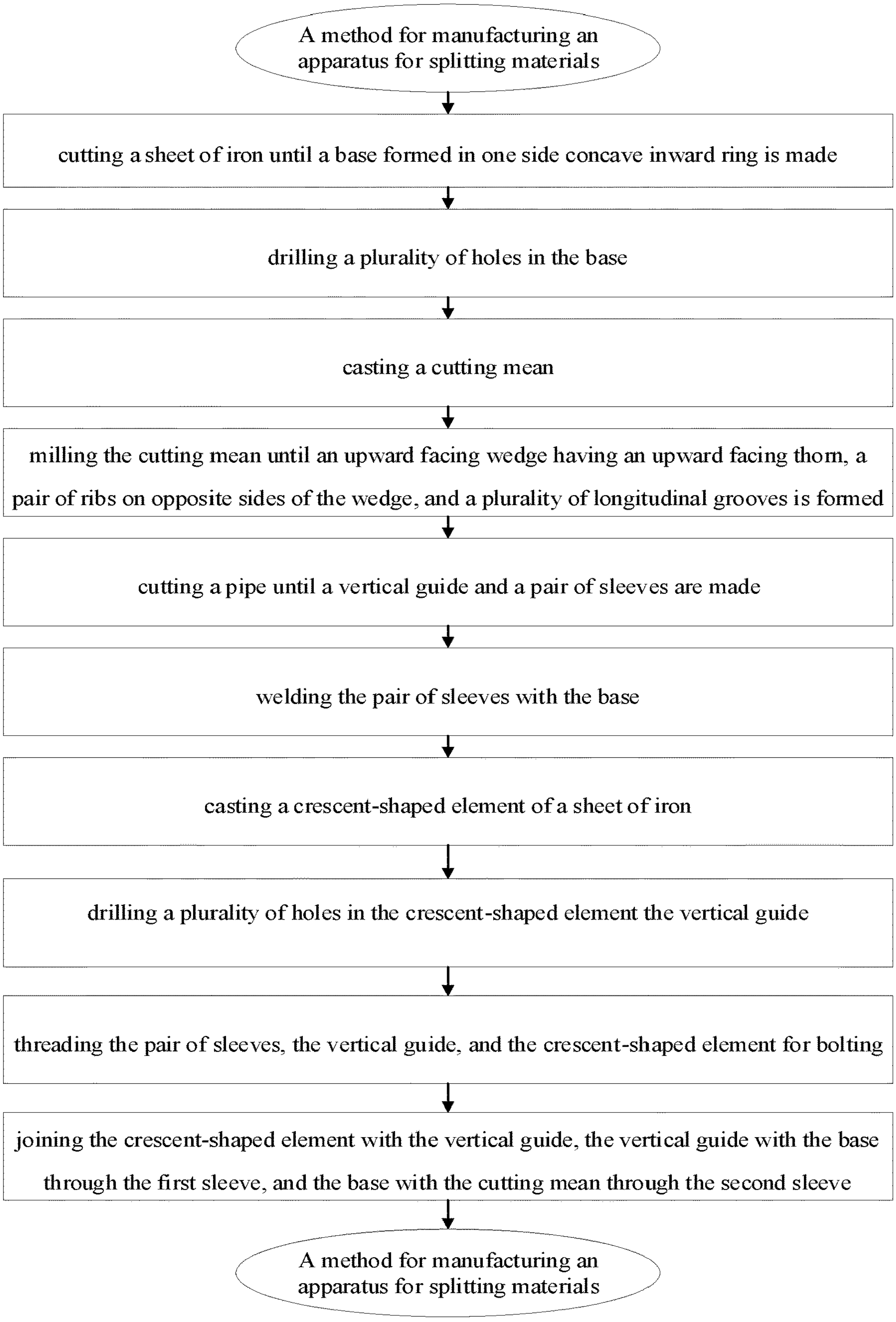
FIG. 7 is a process flow diagram that shows a manufacturing process of the apparatus for splitting materials.

A method for manufacturing an apparatus for splitting materials includes the following steps (FIGS. 1-7):

- cutting a sheet of iron until a base 1 formed in one side concave inward ring is made; drilling a plurality of holes 10 in the base;
- casting a cutting mean 5;
- milling the cutting mean 5 until an upward facing wedge 12 having an upward facing thorn 8, a pair of ribs 9 on opposite sides of the wedge 12, and a plurality of longitudinal grooves 11 is formed;
- cutting a pipe until a vertical guide 2 and a pair of sleeves 6 and 7 are made; welding the pair of sleeves 6 and 7 to the base;
- casting a crescent-shaped element 4 of a sheet of iron;
- drilling a plurality of holes 3 in the crescent-shaped element 4 the vertical guide; threading the pair of sleeves 6 and 7, the vertical guide 2, and the crescent-shaped element 4 for bolting;
- joining the crescent-shaped element 4 with the vertical guide 2, the vertical guide 2 with the base 1 through the first sleeve 7, and the base with the cutting mean through the second sleeve 6.

The preferred device material is steel.

Thus, this invention provides users with effective, safe, inexpensive, and highly portable device and methods with which the splitting materials is also effective, economically, and safely possible for end users.

While only certain features and embodiments of the disclosure have been illustrated and described, many modifications and changes may occur to those skilled in the art without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosed embodiments. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. An apparatus for splitting materials, comprising:

a base defined by a surface and a perimeter, the base having a plurality of holes and configured to support the apparatus;

a pair of sleeves;

a cutting mean comprising:

a bottom end;

an upward facing wedge comprising:

an upward facing thorn formed on a top end of the wedge;

a pair of ribs formed on opposite sides of the wedge;

a plurality of longitudinal grooves;

a vertical guide configured to join with the base;

a crescent-shaped element configured to join with the vertical guide;

wherein the cutting mean is configured to join with the base by the bottom end through the first sleeve;

wherein the vertical guide is configured to join with the base through the second sleeve;

wherein the base is formed in one side concave inward ring;

wherein the cutting mean is joined with the base on the side of the concavity of the base and the vertical guide is joined with the base on the opposite side of the concavity of the base.

* * * * *